United States Patent
Dematteis

[11] Patent Number: 6,095,687
[45] Date of Patent: Aug. 1, 2000

[54] FLAT BOTTOMED PLASTIC BAG

[75] Inventor: Robert B. Dematteis, Grass valley, Calif.

[73] Assignee: Bob Dematteis Co., Grass Valley, Calif.

[21] Appl. No.: 09/257,361

[22] Filed: Feb. 25, 1999

Related U.S. Application Data

[60] Provisional application No. 60/088,613, Jun. 9, 1998, provisional application No. 60/088,612, Jun. 9, 1998, provisional application No. 60/089,582, Jun. 17, 1998, provisional application No. 60/089,583, Jun. 17, 1998, provisional application No. 60/092,232, Jul. 9, 1998, and provisional application No. 60/092,233, Jul. 9, 1998.

[51] Int. Cl.[7] .......................... B65D 30/18; B65D 30/20
[52] U.S. Cl. ............................................................. 383/104
[58] Field of Search .................................... 383/104, 122

[56] References Cited

U.S. PATENT DOCUMENTS

| | | |
|---|---|---|
| Re. 33,264 | 7/1990 | Baxley . |
| Re. 34,324 | 7/1993 | Haenni . |
| D. 287,572 | 1/1987 | Dancy . |
| D. 288,779 | 3/1987 | Pilon . |
| D. 307,555 | 5/1990 | Haenni . |
| D. 308,170 | 5/1990 | Wilfong . |
| D. 323,619 | 2/1992 | Wilfong . |
| D. 325,311 | 4/1992 | Mygind . |
| D. 396,636 | 8/1998 | Wilfong . |
| 1,180,330 | 4/1916 | Spaulding ............... 383/122 |
| 2,339,305 | 1/1944 | Wagner ................... 383/122 |
| 2,481,380 | 9/1949 | Andersonk, Sr. ........ 383/122 |
| 3,136,475 | 6/1964 | Geimer ................... 383/122 |
| 3,319,684 | 5/1967 | Calhoun .................. 383/120 |
| 3,352,214 | 11/1967 | McColgan ............... 383/122 |
| 3,739,977 | 6/1973 | Shapiro et al. .......... 493/189 |
| 3,743,172 | 7/1973 | Ackley et al. ........... 383/104 |
| 4,041,851 | 8/1977 | Jentsch ................... 383/122 |
| 4,480,750 | 11/1984 | Dancy . |
| 4,529,090 | 7/1985 | Pilon . |
| 4,676,378 | 6/1987 | Baxley . |
| 4,696,403 | 9/1987 | Hoover . |
| 4,717,262 | 1/1988 | Roen et al. .............. 383/104 |
| 4,786,275 | 11/1988 | Hoover . |
| 4,793,539 | 12/1988 | Haenni . |
| 4,807,754 | 2/1989 | Rowe . |
| 4,819,899 | 4/1989 | Weil . |
| 4,849,090 | 7/1989 | Case . |
| 4,872,766 | 10/1989 | Dancy . |
| 4,911,560 | 3/1990 | Hoover . |
| 4,923,436 | 5/1990 | Gelbard . |
| 4,925,512 | 5/1990 | Briand . |
| 4,930,385 | 6/1990 | Wilfong . |
| 4,953,664 | 9/1990 | Vrooman . |
| 4,981,216 | 1/1991 | Wilfong . |
| 4,995,860 | 2/1991 | Wilfong . |
| 5,020,750 | 6/1991 | Vrooman . |
| 5,125,604 | 6/1992 | Vrooman . |

(List continued on next page.)

*Primary Examiner*—Stephen P. Garbe
*Attorney, Agent, or Firm*—Townsend and Townsend and Crew LLP

[57] ABSTRACT

An expandable plastic film gusseted bag is utilized. As in conventional bag manufacture, each front gusset panel is connected to a rear gusset panel and each of the gusset panels is foldable between the front panel and the rear panel to provide a continuous bag periphery. A bottom joins the bottom of the front panel, rear panel, two rear gusset panels and two front gusset panels at substantial right angles to the side edges of the front panel, rear panel and gusset panels to close the bottom of the bag and leave only the top open. The improvement provides each plastic bag with eight first linear folding axes, each configured adjacent the bottom and within one of the front panel, each front gusset panel, the rear panel and each rear gusset panel. These folding axes extend from a joinder of a gusset at the bottom to the side edges of the front panel or the rear panel and the front gusset panel or the rear gusset panel at an approximate 45° angle. The folding axes are made by a process from to a group consisting of either a cold seal or a hinge in the plastic film while the film is planar. On opening of the expandable gusseted bag, the bottom seal of the bag is disposed adjacent the gussets and forms a generally triangular shaped overlay relative to the gussets to form a flat bottom bag.

17 Claims, 4 Drawing Sheets

U.S. PATENT DOCUMENTS

| | | | |
|---|---|---|---|
| 5,184,896 | 2/1993 | Hammond et al. | 383/104 |
| 5,207,367 | 5/1993 | Dunn . | |
| 5,207,368 | 5/1993 | Wilfong . | |
| 5,273,362 | 12/1993 | Buchanan | 383/120 |
| 5,335,788 | 8/1994 | Beasley . | |
| 5,362,152 | 11/1994 | Fletcher . | |
| 5,375,930 | 12/1994 | Tani | 383/104 |
| 5,562,580 | 10/1996 | Beasley . | |
| 5,667,173 | 9/1997 | Wilfong . | |
| 5,845,779 | 12/1998 | Wilfong . | |
| 5,881,882 | 3/1999 | Fletcher . | |

FLAT BOTTOMED PLASTIC BAG

CROSS-REFERENCES TO RELATED APPLICATIONS

This application claims priority from Provisional Patent Application 60/088,613 filed Jun. 9, 1998 by the named inventor herein entitled Plastic Film Hinging and Pre-Creasing Process patent application Ser. No. 09/257,345 filed Feb. 25, 1999 of even date herewith entitled Plastic Film Hinging and Precreasing Process is likewise incorporated by reference as if fully set forth herein.

This application claims priority from Provisional Patent Application entitled Cold Sealing of Plastic Film 60/088,612 filed Jun. 9, 1998 by the named inventor herein. Patent application Ser. No. 09/257,848 filed Feb. 25, 1999 of even date herewith entitled Apparatus and Process for Cold Seal in Plastic Bags is likewise incorporated by reference as if fully set forth herein.

This application claims priority from Provisional Patent Application 60/089,582 filed Jun. 17, 1998 by the named inventor herein entitled Plastic Bag Bundling System. Patent application Ser. No. 09/258,010 filed Feb. 25, 1999 of even date herewith entitled Plastic Bag Bundling System is likewise incorporated by reference as if fully set forth herein.

This application claims priority from Provisional Patent Application 60/089,583 filed Jun. 17, 1998 by the named inventor herein with Don Pansier of Greenbay Wisconsin entitled Automatic Ventilating System. Patent application Ser. No. 09/258,033 filed Feb. 25, 1999 of even date herewith entitled Automatic Ventilating System is likewise incorporated by reference as if fully set forth herein.

This application claims priority from Provisional Patent Application 60/092,232 filed Jul. 9, 1998 entitled Plastic Bag Manufacturing Process by the named inventor herein. Patent application Ser. No. 09/257,843 filed Feb. 25, 1999 of even date herewith entitled Plastic Bag Manufacturing Process is likewise incorporated by reference as if fully set forth herein.

Finally, this application claims priority from Provisional Patent Application 60/092,233 filed Jul. 9, 1998 entitled Plastic Film Rigidity Means by the named inventor herein. Patent application Ser. No. 09/258,015 filed Feb. 25, 1999 of even date herewith entitled Plastic Film Rigidity Means is likewise incorporated by reference as if fully set forth herein.

The above Provisional Applications and all following Regular Patent Applications filed of even date herewith—and all of them—are herein incorporated by reference as if fully set forth herein.

This invention relates to plastic flat bottom bags. More particularly, a plastic flat bottom bag is illustrated where either a hinge, a cold seal, and/or a hybrid cold seal and hinge forms a linear folding axis for squaring out the bottom of the bag. This construction enables rapid bag manufacture of the resultant flat bottom bag making this design competitive for the first time with conventional plastic bags

BACKGROUND OF THE INVENTION

Flat bottom plastic bags are known.

In such flat bottom plastic bags, it is necessary to form a folding axes so that upon bag opening, the flat bottom of the bag hinges along diagonal fold lines to "square out" and form an upstanding bag structure for the receipt of articles to be placed in the bag. In addition to paper bags in commerce, exemplary of the prior art is:

Platz et al U.S. Pat. No. 3,917,159 takes an already manufactured bag and folds the bottom so that it will "square out."

Le Fleur et al U.S. Pat. No. 3,915,077 utilizes individual heat seals to form the "squared out" portion of the bag.

Hanson et al U.S. Pat. No. 3,988,970 discloses a bag process where a square bottom bag is first produced. Thereafter, the bag is folded so that the plastic film emulates the folding present in ordinary paper bags. This folding process occurs after the square bottom bag is fully manufactured.

Ross et al relates to a plastic bag that utilizes among other constitutents glue.

In the disclosure that follows, a plastic bag is manufactured which uses either "cold seals", hinges, and/or hybrid cold seals and hinges in plastic film for the rapid production and formation of a plastic bag. It is important that the reader understand both of the "cold seal" and "hinge" terms and how they are limited in the disclosure that follows.

First, it is important to understand that in modem plastic bag manufacturing technology, speed of film processing is essential. In a typical bag manufacturing process, film passes through a machine for bag manufacture at rates up to 300 feet per minute is required for economic manufacture. Further, each manufacturing step must anticipate the subsequent opening and loading of the bag. As a consequence, steps taking an inordinate amount of time slow down the bag line speed and are generally unacceptable. Further, any bag post-production step—such as folding an already manufactured bag—is unacceptable.

Because of this speed requirement, so-called "hot seals" are generally not acceptable for any portion of the bag that does not require full strength sealing. In a hot seal, one film layer of a bag is permanently fused to another film layer of a bag. Hot seals take time to produce. Melting must be sufficient for complete fusing to take place between the bag parts. As a result, a hot seal is a significantly slower method of plastic bag manufacture than either utilizing a "cold seal" or forming a "hinge" within plastic film.

In a hot seal application transverse to the direction of film conveyance during plastic film bag manufacture, line speeds of the passing plastic film are usually limited to 150 feet per second. In the manufacture of the disclosed bag, line speeds in the range of 300 feet per second can be tolerated.

Hot seals produce permanent fusing of the plastic layers involved. Such permanent fusing can be detected by trying to separate the joined film layers. When such an attempt is made to separate the two layers joined by a hot seal, either joined film layer tears. The "hot seal"—composed of two layers fused one to another—does not tear and remains in tact.

Regarding the use of a "cold seal", in the plastic bag manufacturing arts, there has been known for many years a defective seal known as a "cold seal." Such a cold seal has here to fore been an imperfect hot seal. Usually, the imperfect hot seal would be located at the bottom of a plastic bag. When load was placed in the plastic bag, the seal would part—and the bag contents drop to the ground, usually causing content loss and damage.

Cold seals as used in the specification that follows are easy to distinguish. Where a cold seal is present, it imperfectly seals two plastic film layers together. This imperfect fusing can be easily recognized. Film separation at the cold seal allows the two imperfectly fused film layers to separate. Each layer separates from the other layer without losing substantial structural integrity of the film. Unlike the conventional "hot seal", neither of the previously fused film layers tears when separation occurs.

Cold seals have been used with plastic bags for joining bags loosely in a bundle. Such joinder usually takes place at the top of the bag adjacent the opening. In the typical application, separation of a bag from a bundle of bags at a cold seal usually assists in the opening of the bag.

Until this disclosure, no one has made a "cold seal" an important structural element of a bag!

In addition to the "cold seal", this disclosure makes use of a preformed "hinge" with the plastic film of the bag wall. Such hinges are capable of rapid formation by impressing the rapidly passing and planar film along a linear boundary. This impressing at the linear boundary leaves the film predisposed to "hinge" or fold at the boundary.

The hinge that is here utilized is to be distinguished from a "fold." In folding, film is bent over and then creased so that it folds. Once this bending and creasing has occurred, the film is disposed to repeat the bending and folding along the crease.

The "hinge" here utilized is place in the plastic film of the bag wall while the film is planar or in the "lay flat condition—and passes through the bag machine at high speed. The placed linear hinge is typically either at right angles to the direction of film motion or alternatively diagonal to film motion. Thus the hinge here used, is not to be confused with side gusset creases that result from creased folds made in the direction of film passage. When the film is hinged—for the first time from the lay flat state to the erect disposition of the bag—the hinge structure impressed in the film predisposes the film to bend along the hinge axis. Through the combination of the hinge joining panels of plastic across the multiple flat surfaces of an erect bag, sufficient structural integrity is imparted to the bag to remain upright and open to receive and contain articles—such as fast food orders.

The front panel, rear panel and gusset panels each include a plastic film having a predetermined thickness sufficient for the plastic film to remain planer in an absence of a first bending moment applied across the plastic film. The hinge includes at least one linear groove configured in the plastic film to reduce the predetermined thickness of the plastic film at the linear groove and to permit preferential hinging of the plastic film at the linear groove. Such hinging occurs responsive to a bending moment. This is because the linear groove has insufficient depth to sever the plastic film and retains sufficient remaining thickness at the linear groove to permit hinging and not tearing of the plastic film at the linear groove.

The reader should also understand that the difference between a "cold seal" and a "hinge" is not always precise. For example, where plastic film is passing a die at relatively high speed, and the dye come down upon two or more layers of plastic film, a hybrid "cold seal and hinge" can result. The cold seal will be recognizable by the imperfect fusing of the plastic layers one to another. The hinge will be recognizable by the reduction in thickness of the plastic film wall with the increased tendency of the film to fold at the hinge. It has been found that hybrid "cold seal" and "hinge" structures are produced in the bag production process herein set forth.

In the disclosure that follows, neither the "cold seal" nor the "hinge" incorporate or refer to bending and creasing film so that the film may bend again along the bend or the crease. In both the cases of the "cold seal" and "hinge", the film is at all times flat and planar when the "cold seal" or "hinge" is applied and introduced. This is known as the "lay flat" condition.

SUMMARY OF THE INVENTION

An expandable plastic film gusseted bag includes a front panel of plastic film having two substantially parallel side edges; and a rear panel of plastic film having two substantially parallel side edges. Two front gusset panels of plastic film are used. Each front gusset panel is connected to one of the two substantially parallel side edges of the front panel. Two rear gusset panels of plastic film are used. Each rear gusset panel is connected to one of the two substantially parallel side edges of the rear panel. As in conventional bag manufacture, each front gusset panel connected to a rear gusset panel and usually each of the gusset panels are foldable between the front panel and the rear panel to provide a continuous bag periphery. A bottom joins the bottom of the front panel, rear panel, two rear gusset panels and two front gusset panels at substantial right angles to the side edges of the front panel, rear panel and gussets to close the bottom of the bag and leave only the top open. The improvement provides each plastic bag with eight first linear folding axes configured adjacent the bottom within each front panel and each front gusset panel and each rear panel and each rear gusset panel having one first linear folding axes. These folding axes extend from a joinder of a gusset at the bottom to the side edges of the front panel or the rear panel and the front gusset panel or the rear gusset panel at an oblique angle in the range of 45°. The folding axes are made by a process restricted to a group consisting of either a cold seal, a hinge, or a hybrid cold seal and hinge being placed in the plastic film while the film is planar or in the "lay flat" disposition. On opening of the expandable gusseted bag, the bottom seal of the bag disposed adjacent the gussets forms a generally triangular shaped overlay relative to the gussets to form a square bottom bag.

DESCRIPTION OF THE SPECIFIC EMBODIMENTS

Figure 1:
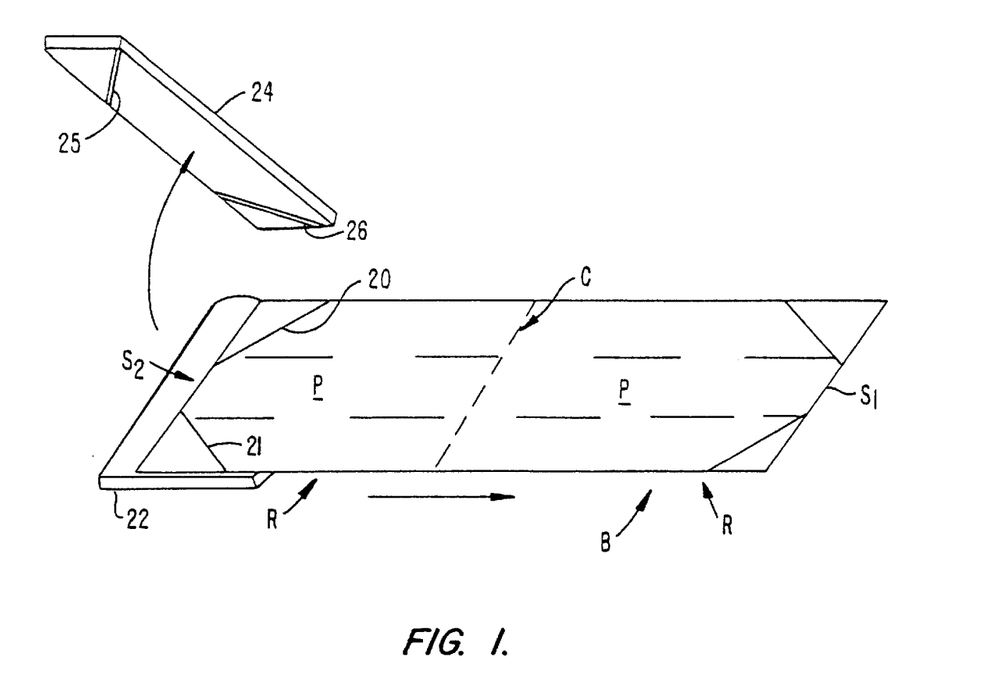
FIG. 1 is a schematic representation of a "cold seal" apparatus illustrating the diagonal placement of cold seal in rapidly passing planar film for causing the "imperfect" joinder of two layers of bag material.

Referring to FIG. 1, double bag unit D is shown passing along bag production line B. This double bag unit D is sealed at both ends along leading seal S1 and trailing seal S2. As will herein after be made clear, eventually, double bag unit D will be severed medially at medial cut C. This severance will allow an opening for each bag of the double bag unit D to occur in the center with flat bottoms at each end.

Double bag unit D is a gusseted bag construction. As such gussets are attached between front panel P and rear panel R, they may be seen expanded in the view of FIG. 6 as front and rear gusset panels 64 and 66 respectively. The reader will understand that the schematic of FIG. 1 is for the purpose of illustrating the placement of cold seals 20 and 21. All other features of the bag construction have been omitted.

Returning to FIG. 6, a typical flat bottom bag is illustrated. This includes the placement of cold seals or hinges 70 at the bottom portion of the illustrated and expanded bag. It will be developed that the hinging of the flat bottom bag illustrated in FIG. 6 can either be a hinge or a cold seal. For the purposes of FIGS. 1 and 2, only the cold seals 21, 22 are considered.

Returning to FIG. 1, it is seen that die 24 having cold seal impressing ridges 25 and 26 overlies double bag unit D. For the purposes of FIG. 1, die 24 has been rotated up and away from double bag unit D so that ridges 25 and 26 are plainly visible. As is schematically illustrated, die 24 impresses on platten 22 with double bag unit D captured there between. Impressing of die 24 may be heated or done in the cold state. In any event there is an imperfect joinder of at least two layers of plastic material. To understand how this imperfect joinder operates, the readers attention is invited to FIG. 2.

Figure 2:
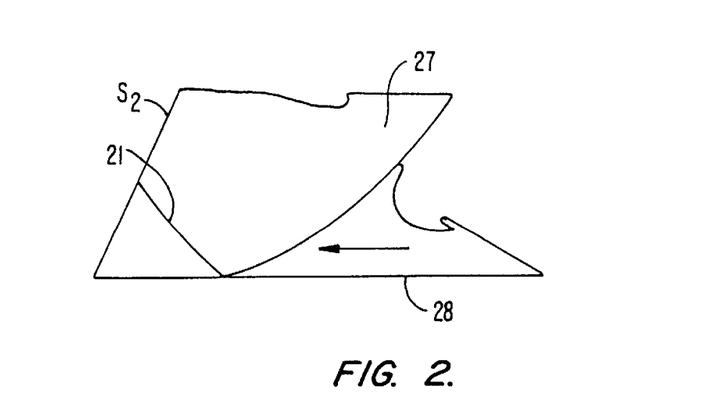
FIG. 2 illustrates the separation of two "imperfectly fused" joined layers illustrating that upon separation of the layers that each of the separated layers retains its structural integrity.

Referring to FIG. 2, two plastic layers 27, 28 are being separated from one another. Such separation easily occurs until cold seal 21 is reached. At cold seal 21, it will be found that the respective layers 27, 28 are imperfectly joined to one another. Easy separation will stop along the boundary of cold seal 21.

If one continues to try to separate respective layers 27, 28 beyond cold seal 21, such separation will eventually be successful. Separation will occur to seal 21. Both respective plastic layers 27, and 28 will maintain their structural integrity. In the usual case, the broken cold seal will not appreciably weaken the layers 27, 28.

Figure 5:
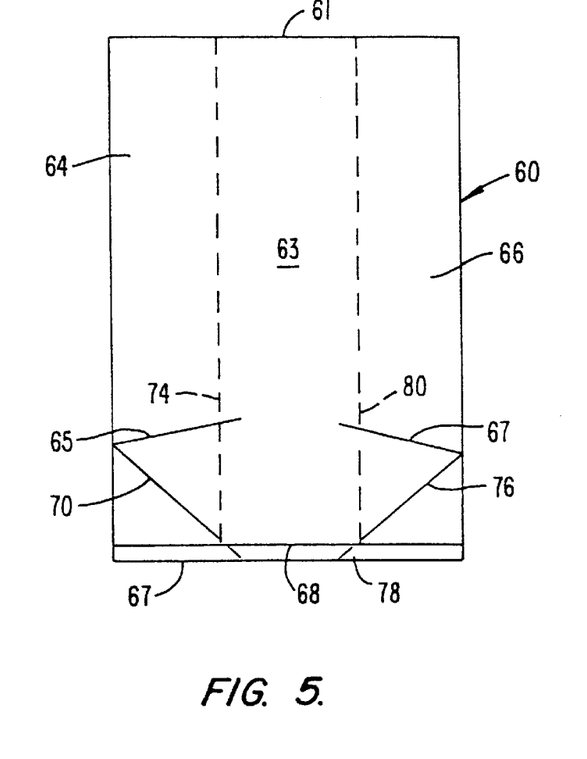
FIG. 5 is a side elevation view of the plastic bag article of this invention illustrating in particular the placement of the "folding axes" (either hinges, cold seals, or both) in the side wall of a flat bottom plastic bag predisposing the bag to open and "flat out" when used for the first time.
Figure 6:
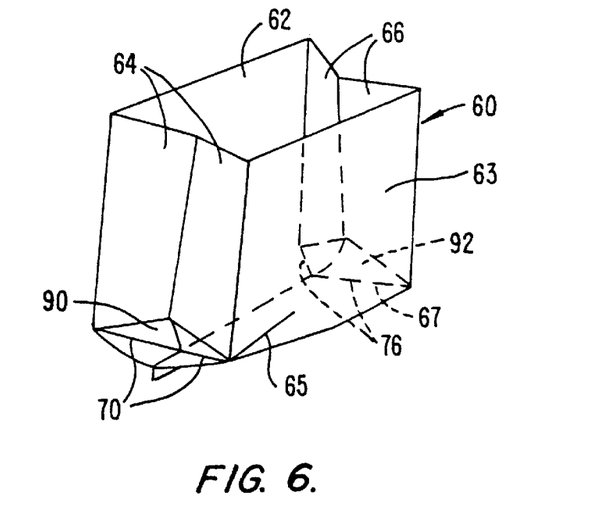
FIG. 6 is a perspective view of the bag of FIG. 5 being opened and "flattened out" for the placement of articles into the bag.

A brief preview of how cold seal/hinge 70 functions to allow the opening of a flat bottom bag is in order with quick reference to FIG. 6. Referring briefly to FIG. 5, and then to FIG. 6, it will be seen that when the flat bottom bag, cold seal represents a point of increased resistance only to opening of the bag. This is sufficient to cause the bottom of the bag to "flat out" during the opening process.

Figure 3:
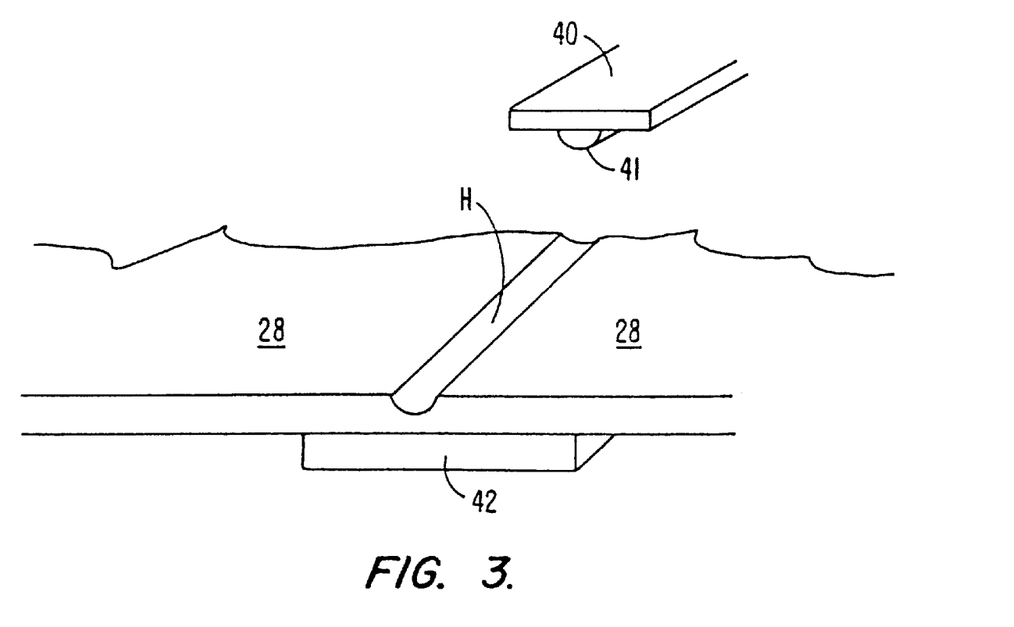
FIG. 3 illustrates a "hinge" as it is here defined being placed within a plastic bag wall while the film is disposed in a planar condition.
Figure 4:
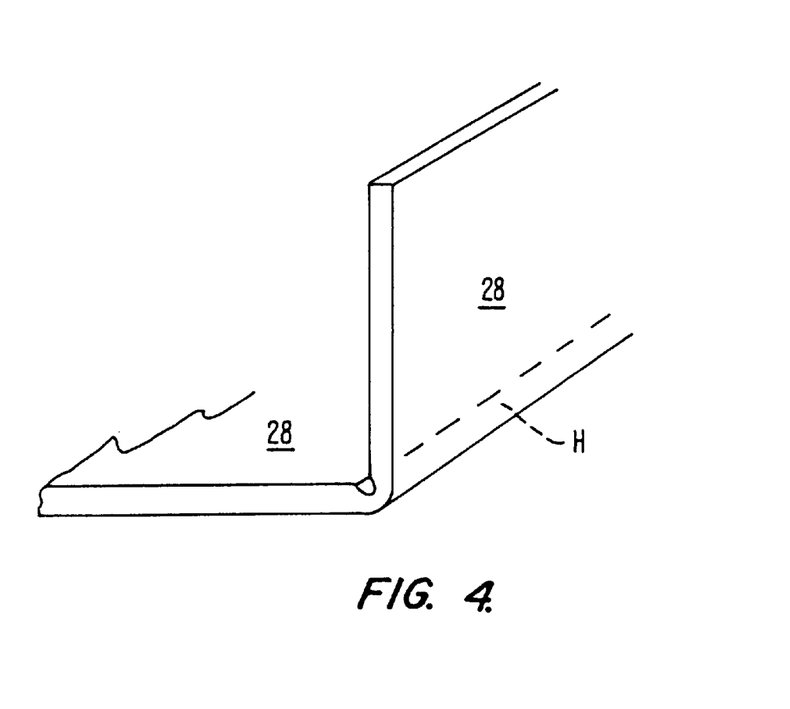
FIG. 4 is a expanded side elevation section of the plastic film at the hinge illustrating the linear impression in the plastic film which leave the film when folded for the first time with the predisposition to fold along the linear axes of the fold.

I have also discovered that the placement of a hinge in location 70 of the illustrated flat bottom bag has the same effect. Specifically, and referring to FIG. 3, plastic film 28 is impressed with hinge H. Impression occurs between die 40 and platten 42. As before, die 40 has ridge 41 extending across the bottom of the die in the path of hinge H. Again, the path of hinge H is linear and constitutes a reduction in thickness of film 28 along the axis of hinge H.

Refer again to FIGS. 5 and 6. Assume that instead of cold seals 20, 21, hinge H is placed at cold seal/hinge 70 and 76 at the bottom of flat bottom bag. Again squaring of the bag B will occur. In other words, either a cold seal such as cold seals 20, 21 or hinge H will predispose the bag article of FIG. 5 to open as the flat bottom bag illustrated in FIG. 6.

Taking the case of the open flat bottom bag, it will be remembered that the production here illustrated forms the bag completely in flat and planar state. When the bag moves to the disposition shown in FIG. 6, the bag is opened for the first time. This being the case, it will be realized that cold seal/hinge 70 need only be highly transitory. In short, they need to work only once.

Further, it will be understood that both the cold seal and the illustrated hinge do not have to have the full strength of the plastic film to operate satisfactorily. All that needs to happen is to have their respective formation add to the bag the predisposition to open and flat out at the bottom. Once this is achieved, the bag can be conventionally loaded and conventionally used.

It should be understood that the hinge or cold seal used with this invention can be hybrid. In this case, impressing of a cold seal may reduce the thickness of the plastic film giving the bag a tendency to "hinge" along the cold seal. At the same time, the vicinity of the hinge may result in an imperfect bond along the linear hinge axis with adjoining sheets of plastic film. This imperfect bond coupled with the "hinge effect" causes the film processed in the "lay flat" disposition to open and form preferentially a flat bottom contour.

Having said this much, the remaining structure of the illustrated bag can be described. Turning FIG. 5, the bag has open top 61, front panel 63, front gusset panels and rear gusset panels 64, 66 with central gusset fold 74, 80. The bag includes sealed bottom 68. In accordance with the preferred embodiment, hinges 65, 67 are impressed in the bag front panel 63 and rear panel 62. These hinges have been shown to react to a panel type hinging to impart additional strength to the bag.

Referring to FIG. 6, the open bag is shown with its flat bottom. It includes front and rear gusset panels 64, 66 extending between front panel 63 and rear panel 62. It will be seen that these respective front and rear gusset panels 64, 66 are in the full open position imparting to the bag a flat profile from the opening toward the bag bottom. At the bag bottom, characteristic triangular folds 90 will form. These characteristic folds dispose the bag with its flat bottom resting downward. In fact, after opening an empty bag from the disposition shown in FIG. 5, to that of FIG. 6, it has been demonstrated that the bag physically rests in the disposition of FIG. 6. In short, a clerk may load the open bag at the bottom without fear of bag collapse to the closed position.

Figure 7:
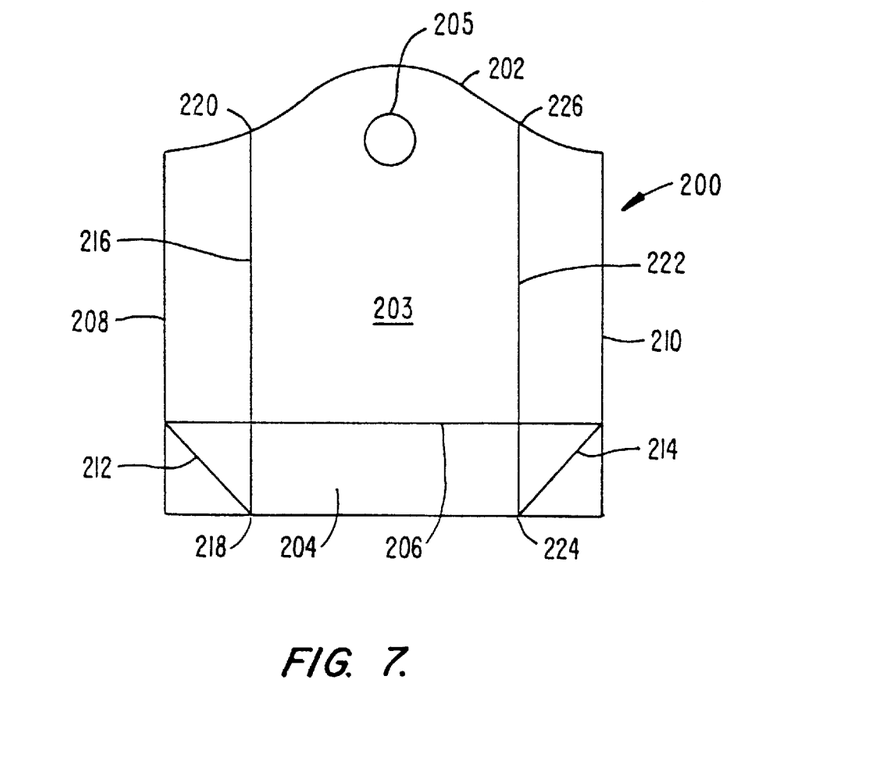
FIG. 7 is a so-called "side weld" bag shown having the hinge axes of this invention; and, FIG. 8 is the side weld bag of FIG. 7 in the open disposition.

In FIG. 7 side weld bag 200 has a top 202, a front panel 203, a rear panel (not shown), a die cut handle 205, a bottom gusset 204 and its center gusset crease 206, and side welded edges 208 and 210. At 45 degree angles in both outer regions of bottom gusset 204 are hinge axes 212 and 214 which respectively terminate approximately at the point where center crease 206 crosses side weld 208 and where center crease 206 crosses side weld 210. A vertical bi-directional hinge 216 begins at point 218 and terminates at point 220 and another bi-directional hinge 222 begins at point 224 and ends at point 226, both of which hinges have been impressed upon front wall 203, rear bag wall (not shown) and bottom gusset 204.

Figure 8:
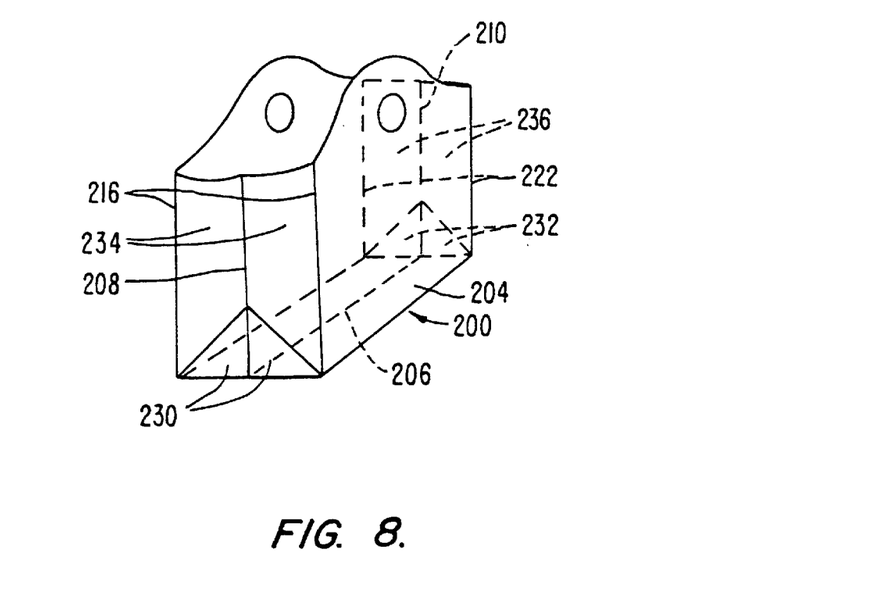

In FIG. 8, the side weld bag 200 of FIG. 7 has been opened and sits upright upon bottom gusset 204. Bottom gusset 204 folds upwardly between the front and rear panel walls. Linear hinge axes 212 and 214 cause the lower outer regions 230 and 232 respectively to turn upright and help flat out the bottom gusset assisting in the formation of a flat base. In turn, bi-directional hinge 216 causes the upper outer region 234 to stand up and box out and side weld 208 to cooperate by turning inward. Hinge 222 causes its respective upper outer region 236 to stand up and box out and side weld 210 to cooperate by turning inward. Bag 200 is now ready to be loaded.

It is easy to see that cold sealing the bottom gusset in side weld bags has a similar outcome as cold sealing the side gussets in bottom seal bags described in FIGS. 5, and 6.

Some attention should be given to the linear hinge axis which is at an oblique angle—most preferably 45°. It will be understood that variations in this angle can occur. For example, the angle can easily vary in the range of 40° to 50°. Further, both of the oblique axes do not have to be identical. They may each vary by differing amounts. All that is required is that the axes produce a tendency of the bag which is manufactured in the lay flat condition to hinge and open with a flattened out bottom.

What is claimed is:

1. An expandable plastic film gusseted bag having:
   a front panel of plastic film having two substantially linear side edges;
   a rear panel of plastic film having two substantially linear side edges;
   two front gusset panels of plastic film, each front gusset panel connected to one of the linear side edges of the front panel;
   two rear gusset panels of plastic film, each rear gusset panel connected to one of the linear side edges of the rear panel;
   each front gusset panel also connected to a respective one of said rear gusset panels;
   each of the front and rear gusset panels being foldable relative to the front panel and the rear panel;
   a bag bottom connecting bottoms of the front panel, the front gusset panels, the rear gusset panels and the rear panel to provide the bag with a closed bottom;
   an improvement comprising:
      eight first linear folding axes positioned adjacent the bag bottom, each said axis being within one of the front panel, each one of the front gusset panels, each one of the rear gusset panels, and the rear panel, each said panel including at least one portion located proximate a side edge thereof for spacing a respective one of said linear folding axes from a corner of said bag when said bag is unopened, each said portion being free of a hot seal between its respective panel side edge and said bag bottom;
      each linear folding axis extending at an approximate oblique angle with respect to the bag bottom when said bag is folded, and each linear folding axis selected from a group consisting of a portion of a cold seal, a hinge having a thickness that is less than a thickness of the plastic film, and a portion of a hybrid cold seal and hinge; and
      whereby when the expandable gusseted bag is opened, the bottom of each of the front panel, one of the front gusset panels, one of the rear gusset panels, and the rear panel form a generally triangular shaped overlay and a portion of an open flat bottomed bag.

2. An expandable plastic film gusseted bag according to claim 1 wherein:
   the bottom of the bag has a hot seal.

3. An expandable plastic film gusseted bag according to claim 1 wherein:
   at least one side of the bag has a hot seal.

4. An expandable plastic film gusseted bag according to claim 1 wherein
   the plastic film of the front panel, the front gusset panels, the rear gusset panels and the rear panel has a predetermined thickness sufficient for the plastic film to remain planar in an absence of a first bending moment applied across the plastic film; and
   at least one of the linear folding axes includes at least one linear groove configured in the plastic film to reduce the predetermined thickness of the plastic film at the linear groove and to permit preferential hinging of the plastic film at the linear groove responsive to a bending moment, the linear groove having insufficient depth to sever the plastic film and the plastic film retaining sufficient remaining thickness at the linear groove to permit hinging and not tearing of the plastic film at the linear groove.

5. An expandable plastic film gusseted bag according to claim 1 wherein
   each linear folding axis of the front panel, the front gusset panels, the rear gusset panels and the rear panel forms a cold seal with the linear folding axis of an adjacent panel to cause folding of the bag adjacent the cold seal.

6. An expandable plastic film gusseted bag according to claim 1 further including:
   at least eight second linear folding axes each configured in one of the front panel, the front gusset panels, the rear gusset panels, and the rear panel, the second linear folding axes extending centrally of the bag to permit respective folding of the front panel, rear panel, front gusset panels and rear gusset panels to form the flat bottomed bag.

7. An expandable plastic film gusseted bag according to claim 5 further comprising
   at least eight second linear folding axes which are slightly angularly inclined to the side edges of the front panel and the rear panel.

8. An expandable plastic film gusseted bag according to claim 1 wherein
   the oblique angle is 45°.

9. An expandable plastic film gusseted bag comprising:
   a front panel of plastic film having two substantially linear side edges;
   a rear panel of plastic film having two substantially linear side edges;
   two front gusset panels of plastic film, each front gusset panel connected to one of the two substantially linear side edges of the front panel;
   two rear gusset panels of plastic film, each rear gusset panel connected to one of the two substantially linear side edges of the rear panel;
   each front gusset panel also connected to one of the rear gusset panels;
   each of the front and rear gusset panels being foldable between the front panel and the rear panel; and
   a bag bottom joining a bottom of the front panel, rear panel, two rear gusset panels and two front gusset panels at substantial right angles to the side edges of the front panel and rear panel;
   eight first linear folding axes positioned adjacent the bag bottom, each said axis being within one of the front panel, each one of the front gusset panels, each one of the rear gusset panels and the rear panel, each said panel being free of a hot seal between its side edges above said bag bottom;
   each linear folding axis extending at an approximate oblique angle with respect to the bag bottom when said bag is folded, and each linear folding axis selected from a group consisting of a portion of a cold seal, a hinge having a thickness that is less than a thickness of the plastic film, and a portion of a hybrid cold seal and hinge; and whereby when the expandable gusseted bag is opened, the bottom of each of the front panel, one of the front gusset panels, one of the rear gusset panels, and the rear panel form a generally triangular shaped overlay and a portion of a flat bottomed bag.

10. An expandable plastic film gusseted bag according to claim 9 wherein the bottom of the bag has a hot seal.

11. An expandable plastic film gusseted bag according to claim 9 wherein at least one side of the bag has a hot seal.

12. An expandable plastic film gusseted bag according to claim 9 wherein the plastic film of the front panel, the front gusset panels, the rear gusset panels and the rear panel has a predetermined thickness sufficient for the plastic film to remain planar in an absence of a first bending moment applied across the plastic film; and at least one of the linear folding axes includes at least one linear groove configured in the plastic film to reduce the predetermined thickness of the plastic film at the linear groove and to permit preferential hinging of the plastic film at the linear groove responsive to a bending moment, the linear groove having insufficient depth to sever the plastic film and the plastic film retaining sufficient remaining thickness at the linear groove to permit hinging and not tearing of the plastic film at the linear groove.

13. An expandable plastic film gusseted bag according to claim 9 wherein each linear folding axis of the front panel, the front gusset panels, the rear gusset panels and the rear panel forms a cold seal with the linear folding axis of an adjacent panel to cause folding of the bag adjacent the cold seal.

14. An expandable plastic film gusseted bag according to claim 9 further including:

at least eight second linear folding axes each configured in one of the front panel, the front gusset panels, the rear gusset panels, and the rear panel, the second linear folding axes extending centrally of the bag to permit respective folding of the front panel, rear panel, front gusset panels and rear gusset panels to form the flat bottomed bag.

15. An expandable plastic film gusseted bag according to claim 13 further comprising at least eight second linear folding axes which are slightly angularly inclined to the side edges of the front panel and the rear panel.

16. An expandable plastic film gusseted bag according to claim 9 wherein:

the oblique angle is 45°.

17. An expandable plastic film gusseted bag having:

a front panel of plastic film having two substantially linear side edges;

a rear panel of plastic film having two substantially linear side edges;

two front gusset panels of plastic film, each front gusset panel connected to one of the linear side edges of the front panel;

two rear gusset panels of plastic film, each rear gusset panel connected to one of the linear side edges of the rear panel;

each front gusset panel also connected to a respective one of said rear gusset panels;

each of the front and tear gusset panels being foldable relative to the front panel and the rear panel;

a bag bottom connecting bottoms of the front panel, the front gusset panels, the rear gusset panels and the rear panel to provide the bag with a closed bottom;

an improvement comprising:

eight first linear folding axes positioned adjacent the bag bottom, each said axis being within one of the front panel, each one of the front gusset panels, each one of the rear gusset panels, and the rear panel;

each linear folding axis extending at an approximate oblique angle with respect to the bag bottom when said bag is folded, and at least one of the linear folding axes comprising a portion of a cold seal which forms a cold seal with a linear folding axis of an adjacent one of said panels to cause folding of the bag adjacent the cold seal; and whereby when the expandable gusseted bag is opened, the bottom of each of the front panel, one of the front gusset panels, one of the rear gusset panels, and the rear panel form a generally triangular shaped overlay and a portion of an open flat bottomed bag.

* * * * *